(12) United States Patent
Peng et al.

(10) Patent No.: US 11,750,560 B2
(45) Date of Patent: Sep. 5, 2023

(54) ZERO TOUCH PROVISIONING FOR A NETWORK ELEMENT OVER IPV6 UNNUMBERED INTERFACES IN OSPFV3 NETWORKS

(71) Applicant: Ciena Corporation, Hanover, MD (US)

(72) Inventors: Cheng Peng, Nepean (CA); Alex Banc, Ottawa (CA); Muthukumar Balachandran, Ottawa (CA)

(73) Assignee: Ciena Corporation, Hanover, MD (US)

(*) Notice: Subject to any disclaimer, the term of this patent is extended or adjusted under 35 U.S.C. 154(b) by 219 days.

(21) Appl. No.: 17/231,078

(22) Filed: Apr. 15, 2021

(65) Prior Publication Data

US 2022/0337544 A1 Oct. 20, 2022

(51) Int. Cl.
*H04L 61/5046* (2022.01)
*H04L 45/12* (2022.01)
*H04L 61/5007* (2022.01)

(52) U.S. Cl.
CPC .......... *H04L 61/5046* (2022.05); *H04L 45/12* (2013.01); *H04L 61/5007* (2022.05)

(58) Field of Classification Search
CPC .. H04L 61/5007; H04L 61/5046; H04L 45/12
See application file for complete search history.

(56) References Cited

U.S. PATENT DOCUMENTS

| 7,420,933 | B2 | 9/2008 | Booth, III et al. |
| 7,856,024 | B1 | 12/2010 | Karuppiah et al. |
| 9,621,511 | B2 | 4/2017 | Premji et al. |
| 10,282,346 | B1 | 5/2019 | Lue et al. |
| 10,819,574 | B2 | 10/2020 | Peng |
| 10,819,679 | B2 | 10/2020 | Peng |
| 2002/0073182 | A1 | 6/2002 | Zakurdaev et al. |
| 2005/0097223 | A1 | 5/2005 | Shen et al. |
| 2007/0297396 | A1 | 12/2007 | Eldar et al. |
| 2009/0201832 | A1* | 8/2009 | Brown .................... H04L 41/12 370/254 |
| 2010/0287266 | A1 | 11/2010 | Asati et al. |
| 2011/0040933 | A1 | 2/2011 | Swindell |
| 2012/0173646 | A1 | 7/2012 | Lan |
| 2012/0263049 | A1 | 10/2012 | Venkatachalapathy et al. |

(Continued)

FOREIGN PATENT DOCUMENTS

WO 2016/159954 A1 10/2016

OTHER PUBLICATIONS

Cisco Systems, Inc., "Cisco Prime Network Registrar 8.3 DHCP User Guide," Chapter Title: DHCP Options, Mar. 4, 2015, pp. 1-36.

*Primary Examiner* — Elton Williams
(74) *Attorney, Agent, or Firm* — Baratta Law PLLC; Lawrence A. Baratta, Jr.

(57) ABSTRACT

A Zero Touch Provisioning (ZTP) client, such as a network element, includes one or more processors and memory comprising instructions that, when executed, cause the one or more processors to configure an unnumbered interface to communicate via Internet Protocol version 6 (IPv6) and communicate to a server over a network, wherein the unnumbered interface is an interface which does not have an IPv6 address which is routable in the network, auto provision Open Shortest Path First version 3 (OSPFv3) based on a reply from a DHCPv6 relay agent, and request data from the network for provisioning.

20 Claims, 5 Drawing Sheets

(56) References Cited

U.S. PATENT DOCUMENTS

| | | |
|---|---|---|
| 2014/0025806 A1 | 1/2014 | Robitaille et al. |
| 2014/0122674 A1 | 5/2014 | Gray et al. |
| 2014/0325040 A1* | 10/2014 | Moore ................ H04L 41/0672 |
| | | 709/221 |
| 2015/0003282 A1 | 1/2015 | Gourlay et al. |
| 2015/0074246 A1 | 3/2015 | Premji et al. |
| 2016/0164832 A1 | 6/2016 | Bellagamba et al. |
| 2016/0277239 A1 | 9/2016 | Qu et al. |
| 2018/0034698 A1 | 2/2018 | Perez et al. |
| 2018/0183753 A1 | 6/2018 | Vemulakonda et al. |
| 2018/0205573 A1 | 7/2018 | Roychoudhury et al. |
| 2018/0287873 A1 | 10/2018 | Peng |
| 2019/0238539 A1 | 8/2019 | Arora et al. |
| 2019/0342262 A1 | 11/2019 | Peng |
| 2020/0044917 A1* | 2/2020 | Peng .................. H04L 41/0803 |

\* cited by examiner

ZERO TOUCH PROVISIONING FOR A
NETWORK ELEMENT OVER IPV6
UNNUMBERED INTERFACES IN OSPFV3
NETWORKS

FIELD OF THE DISCLOSURE

The present disclosure generally relates to networking. More particularly, the present disclosure relates to systems and methods for Zero Touch Provisioning (ZTP) for a network element over Internet Protocol version 6 (IPv6) unnumbered interfaces in Open Shortest Path First version 3 (OSPFv3) networks.

BACKGROUND OF THE DISCLOSURE

Networks (e.g., optical, packet, etc.) are realized through physical or virtual network elements interconnected to one another. A network element (NE) is a collection of hardware and software configured to implement a node or device in the network. For example, network elements can be implemented via modules that fit into a chassis, a self-contained so-called pizza box, as well as multiple chassis physically connected to one another. Network elements are geographically deployed such as in Central Offices (COs), data centers, huts/shelters, customer premises, etc. The conventional approach to installation and provisioning includes field technicians installing, powering up the network element, and configuring provisioning information to enable the network element to communicate on the network. Zero Touch Provisioning (ZTP) includes automatic configuration of the network element once it is powered up and connected to the network such as to download provisioning information automatically. Low Touch Provisioning (LTP), similar to zero touch provisioning, includes automatic configuration of the network element once the network element is at a minimum configuration for network communication. Advantageously, these approaches to provisioning significantly reduce turn-up time and configuration errors.

Further, network operators are utilizing a user-defined script (e.g., Python script) which is executed on the ZTP network element in order to provision the network element. The scripts are not known in advance. The ZTP NE is required to pull the script down to the network element and allows the script to be executed in an execution environment such as Linux with Python support. The script is responsible for communicating with external configuration servers to download software images, configuration files, etc. The script then interacts with the NEs operating system itself to perform system configuration, configuration modification, software upgrade, operational status reporting, etc. Of note, the conventional approach using a script requires a numbered interface on the ZTP network element. As described herein, a numbered interface has an Internet Protocol (IP) address.

U.S. Pat. No. 10,819,574, "Low or zero touch provisioning systems and methods of network elements over unnumbered interfaces," and U.S. Patent Application Publication No. 20200044917, "Zero touch provisioning script to provision network elements over unnumbered interfaces," the contents of each are incorporated by reference in their entirety, describe an approach for ZTP via unnumbered interfaces on IP version 4 (IPv4) networks through user-defined scripts. The ZTP client sniffs the OSPF Hello packets and constructs the OSPF provisioning based on a combination of the OSPF parameters extracted from the incoming OSPF Hello packets and the IPv4 address assigned by the Dynamic Host Configuration Protocol (DHCP) server. By doing so, the OSPF adjacency can be established without user intervention.

This approach cannot be applied to IPv6 networks because a DHCPv6 server does not assign an IPv4 address to the ZTP client. Therefore, the OSPFv3 router identifier (ID) cannot be constructed uniquely in the OSPFv3 networks. This causes the ZTP client unable to download a boot file through unnumbered interfaces.

BRIEF SUMMARY OF THE DISCLOSURE

The present disclosure relates to systems and methods for Zero Touch Provisioning (ZTP) for a network element over Internet Protocol version 6 (IPv6) unnumbered interfaces in Open Shortest Path First version 3 (OSPFv3) networks. The present disclosure utilizes a DHCPv6 relay agent that inserts OSPFv3 router ID buckets in DHCPv6 reply packets when it forwards packets to a ZTP client via an unnumbered interface. The ZTP client uses the OSPFv3 router ID buckets to construct OSPFv3 router ID and configure the OSPFv3 router. The present disclosure also includes duplicate OSPFv3 router ID detection and resolution.

In an embodiment, a Zero Touch Provisioning (ZTP) client includes one or more processors and memory comprising instructions that, when executed, cause the one or more processors to configure an unnumbered interface to communicate via Internet Protocol version 6 (IPv6) and communicate to a server over a network, wherein the unnumbered interface is an interface which does not have an IPv6 address which is routable in the network, auto provision Open Shortest Path First version 3 (OSPFv3) based on a reply from a Dynamic Host Configuration Protocol version 6 (DHCPv6) relay agent, and request data from the network for provisioning. For the auto provision, the instructions that, when executed, can further cause the one or more processors to sniff OSPFv3 Hello packets on the unnumbered interface to extract data therefrom, and select an OSPFv3 router identifier (ID) based on a random, unused value. For the auto provision, the instructions that, when executed, can further cause the one or more processors to select an OSPFv3 router identifier (ID) based on a random, unused value based on the reply from the DHCPv6 relay agent. The reply from the DHCPv6 relay agent can include one or more ranges of unused OSPFv3 router IDs.

The instructions that, when executed, can further cause the one or more processors to perform duplicate OSPFv3 router identifier (ID) detection and resolution. For the duplicate OSPFv3 router ID detection, the instructions that, when executed, can further cause the one or more processors to examine Link State Advertisements (LSAs) to detect duplicate OSPFv3 router IDs. The ZTP client can be associated with a network element having a plurality of network interfaces including the unnumbered interface and a numbered interface, wherein the unnumbered interface borrows an IPv6 address from the numbered interface. The unnumbered interface can be on an Optical Service Channel (OSC). The instructions that, when executed, can further cause the one or more processors to cause a restart of the ZTP client based on occurrence of a plurality of failures.

In a further embodiment, a Dynamic Host Configuration Protocol (DHCP) relay agent includes one or more processors and memory comprising instructions that, when executed, cause the one or more processors to receive a Dynamic Host Configuration Protocol version 6 (DHCPv6) request from an unnumbered interface on a Zero Touch Provisioning (ZTP) client, forward the DHCPv6 request to a DHCPv6 server and receive a response therefrom, provide Open Shortest Path First version 3 (OSPFv3) router identifier (ID) information to the ZTP client for provisioning thereon, and one of relay the response to the ZTP client and download data for the ZTP client based on the response.

To provide the OSPFv3 router ID information, the instructions that, when executed, can further cause the one or more processors to divide the Internet Protocol version 4 (IPv4) address space into ranges, and provide one or more unused ranges to the ZTP client. The one or more unused ranges can be determined based on examination of Link State Advertisements (LSAs).

In other embodiments, the foregoing instructions and associated steps can be implemented as a method or the instructions can be stored in a non-transitory computer-readable medium.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a network diagram of a network with network elements connected to the network for provisioning configuration information and the like.

DETAILED DESCRIPTION OF THE DISCLOSURE

Again, the present disclosure relates to systems and methods for Zero Touch Provisioning (ZTP) for a network element over Internet Protocol version 6 (IPv6) unnumbered interfaces in Open Shortest Path First version 3 (OSPFv3) networks. The present disclosure utilizes a DHCPv6 relay agent that inserts OSPFv3 router ID buckets in DHCPv6 reply packets when it forwards packets to a ZTP client via an unnumbered interface. The ZTP client uses the OSPFv3 router ID buckets to construct OSPFv3 router ID and configure the OSPFv3 router. The present disclosure also includes duplicate OSPFv3 router ID detection and resolution.

One-Touch Provisioning

One-touch provisioning provides turn-up automation by removing the manual device (initial) configuration work duties/actions from the field technicians. The removal of device (initial) configuration work, along with other controller/Data Collection, Analytics, and Event (DCAE) automation, will, in turn, remove the need for craft interfaces and software applications. This is expected to simplify the field operations in supporting a dynamic mix of multiple-vendor deployment environment by focusing on physical cabling and equipment slotting aspect of the network while relying on a controller and northbound applications to perform the rest of Fault, Configuration, Accounting, Performance, Security (FCAPS) functions. Advantageously, one-touch provisioning has no initial "touch" in the field; field operations focus on physical cabling and equipment slotting aspect of the network, configuration work does not rely on craft interfaces but on the controller and northbound applications, etc. The "touch" happens when a controller correlates a network element to its configuration through the unique identifier of the network element.

Zero-Touch Provisioning

Figure 1:
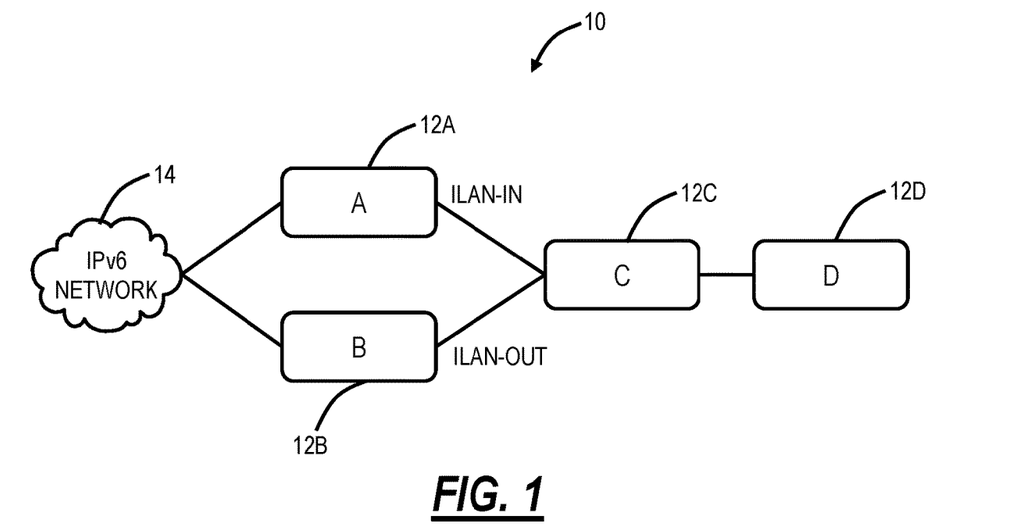
FIG. 1 is a network diagram of a network with network elements (NE).

Unlike one-touch turn-up where the controller correlates the physical NE to the provisioning data, zero touch turn-up requires software/firmware functionality to make such a correlation automatically. The network element may not be identified by a unique ID since it is not known in advance by the northbound applications. Instead, the provisioning data is determined by the location/connectivity of the network element, i.e., topology information. The identity of the network element can be described by the identity of its neighboring network element(s) and the port(s) connecting therein. FIG. 1 is a network diagram of a network 10 with network elements (NE) 12 (labeled as NEs 12A, 12B, 12C, 12D). For example, the identity of the NE 12C can be described as a specific type of shelf which the NE 12A connects to via an ILAN-IN. Inter-shelf Local Area Network (ILAN) is an Ethernet port between the network elements 12. The NE 12C also can be described as the specific type of shelf which the NE 12B connects to via ILAN-OUT. Both descriptions are valid. The NEs 12 can connect to an IPv6 network 14. The configuration is validated on the receiving NE 12.

NE Provisioning

Figure 2:
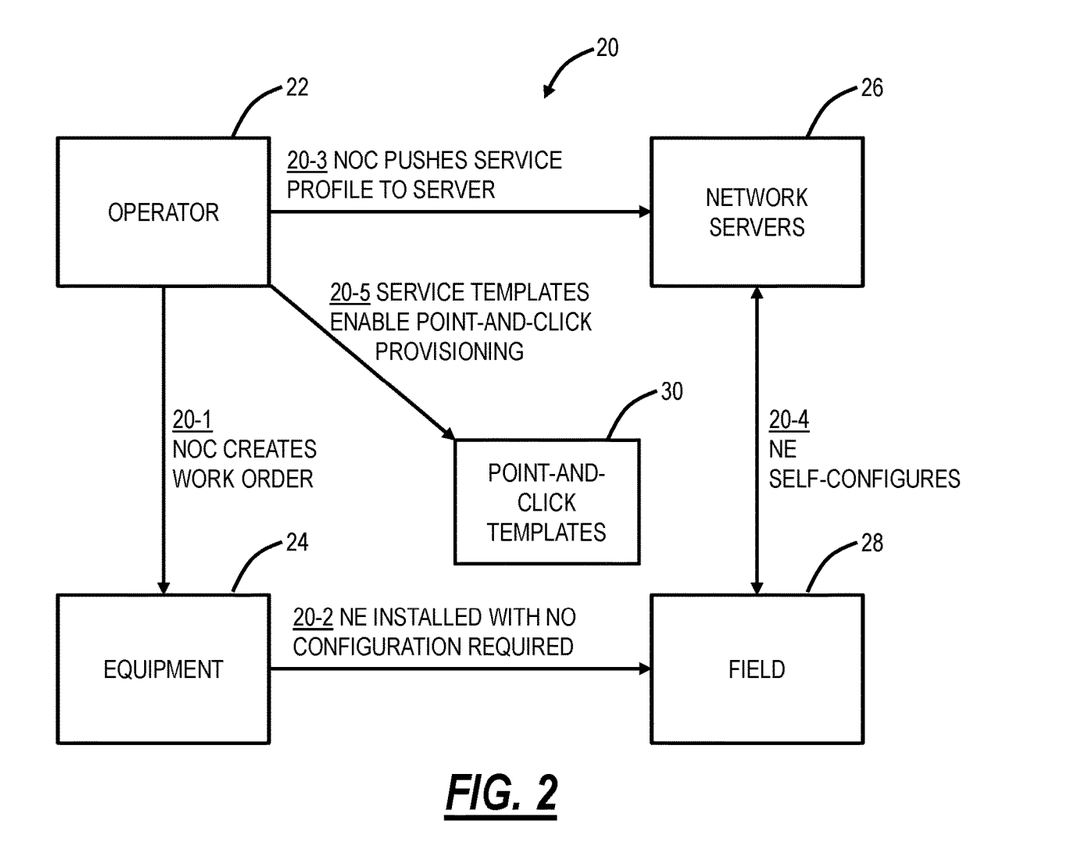
FIG. 2 is a flow diagram of a commissioning process between an operator, an equipment depot, network servers, and a field location.

FIG. 2 is a flow diagram of a commissioning process 20 between an operator 22, an equipment depot 24, network servers 26, and a field location 28. The operator 22 can include engineering, planning, a Network Operations Center (NOC), etc., i.e., personnel associated with a service provider operating and planning the network. The equipment depot 24 can be a warehouse, a vendor, etc., i.e., a location where network element equipment is located, manufactured, stored, etc. The network servers 26 communicate on the network 14 and can include provisioning data for the network elements. Finally, the field location 28 can be a Central Office (CO), Data Center, customer premises, cabinet, shelter, hut, etc., i.e., any location where network elements are deployed in the network.

The commissioning process 20 initiates when the operator 22 creates a work order (step 20-1), i.e., a request for a new network element. The work order is provided to the equipment depot 24 which provides the network element to the field location 28 where the network element is installed with no configuration required (step 20-2). The process of installing the network element at the field location 28 includes physical installation, i.e., installing a shelf in a rack, installing modules or line cards in the shelf, etc., and cabling, i.e., cabling optical and/or electrical interfaces, power, telemetry, etc. Once physically installed and cabled, the network element is powered on. It is at this point of physically powering on the network element where low-touch or zero-touch provisioning begins for the NE. In parallel or associated to the work order 201, the operator 22 provides a service profile, i.e., configuration or provisioning data, to the network servers 26 over the network 14 (step 26). Once the network element is powered up at the field location 28, the network element self-configures such as contacting a DHCP server on the network 14 for an IP address and downloading the configuration or provisioning data from the network servers 26 (step 20-4). A northbound application such as from the network servers 26 can push additional configurations. The network element now supports point-and-click provisioning via service templates 30 (step 20-5).

Network Deployment

Figure 3:
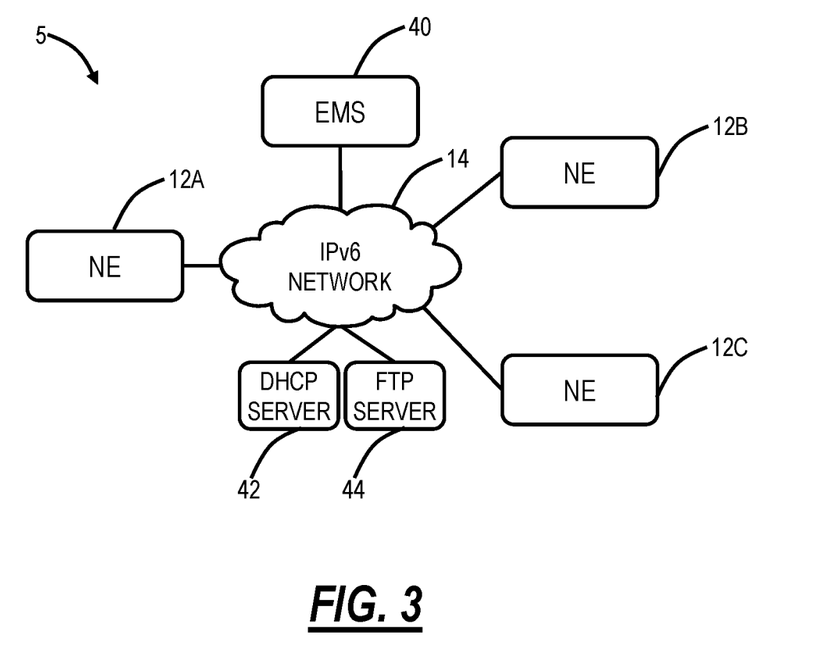

FIG. 3 is a network diagram of a network 5 with network elements 12 connected to the network 14 for provisioning configuration information and the like. FIG. 3 includes three network elements 12A, 12B, 12C communicatively coupled to an Element Management System (EMS) 40 via the network 14. The network elements 12A, 12B, 12C can include an Add/Drop Multiplexer (ADM), a Multi-Service Provisioning Platform (MSPP), a Digital Cross-Connect (DCS), an optical cross-connect, a Packet-Optical Transport System (POTS), an optical switch, a router, a switch, a WDM/DWDM terminal, an access/aggregation device, etc. That is, the network elements 12A, 12B, 12C can be any type of node which realizes/provides some functionality in the network and which requires on-site provisioning and configuration. The network elements 12 support Low Touch Provisioning (LTP) or Zero Touch Provisioning (ZTP) over the network 14.

FIG. 3 illustrates a configuration where the DHCP/FTP servers 42, 44 are located in a layer 3 network. This configuration reduces the EMS management complexity, relative to having the DHCP/FTP servers 42, 44 in the network such as on each of the network elements 12A, 12B, 12C. All configuration files are stored in one or a few centralized DHCP/FTP servers 42, 44. The DHCP/FTP servers 42, 44 can be located in the network 14 or the network elements 12. Redundancy of the DHCP/FTP servers 42, 44 is achieved by introducing another server and the number of the DHCP/FTP servers 42, 44 is not proportional to the number of network elements 12. However, this configuration requires IP reachability and the IP addresses assigned by the DHCP server 42 must be routable.

Note, in the various examples described herein, the FTP server 44 is described for containing and providing configuration information for ZTP/LTP. Those skilled in the art will recognize other protocols besides FTP are also contemplated for providing the configuration information.

LTP/ZTP Over Unnumbered Interfaces

Figure 4:
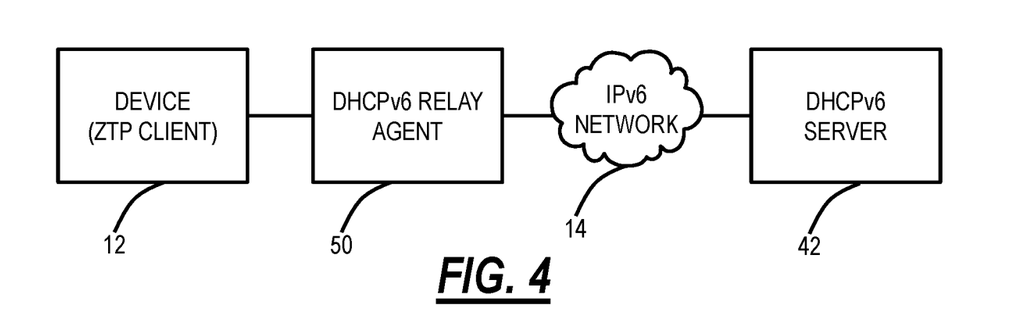
FIG. 4 is a network diagram of a DHCP relay agent between the network element and the DHCP server over the network.

In various embodiments, the systems and methods support LTP/ZTP in the configuration of FIG. 3 where the network elements 12 have unnumbered interfaces to the DHCP/FTP servers 42, 44. Again, LTP/ZTP allows the network elements 12 to be provisioned and configured automatically. The network elements 12 send out a request through DHCP to the DHCP server 42 to obtain the location of its configuration. The network element 12 then downloads and installs the configuration. In the case that the network element 12 is not in the same layer 2 network with the DHCP server 42, a DHCP relay agent is employed as a mediator to forward DHCP packets between clients and servers. FIG. 4 is a network diagram of a DHCP relay agent 50 between the network element 12 and the DHCP server 42 over the network 14. The network element 12 is identified by the identity of the DHCP relay agent 50 as well as the local port connecting to the network element 12. The DHCP relay agent 50 can report such information via option 82 along with the DHCP packets sent by the network element 12 to the DHCP server 42 so that the DHCP server 42 can reply with the specific configuration to the network element 12 in terms of the information.

The approach works sufficiently if the DHCP client (the network element 12) connects over a numbered interface on the network element 12 because a routable IP address is assigned to the interface such that the network element 12 can access to the configuration. However, the technique does not work if the DHCP client (NE 12) connects over an unnumbered interface because 1) the interface does not have its own IP address and 2) the network element 12 is not reachable unless a routing protocol is configured. The routing protocol information cannot be conveyed via the DHCP protocol. Consequently, the network element 12 is not able to reach the configuration, causing ZTP/LTP to fail.

As described herein, the network element 12 includes various interfaces to connect the network 14 including Ethernet ports, Optical Service Channels (OSC), Overhead communication channels, etc. Again, as described herein, an unnumbered interface is an interface on the network element 12 which does not have an IP address and cannot receive an IP address that is routable from the DHCP server 42, but has to communicate on the network 14 anyway. The present disclosure provides an ability for the unnumbered interface to communicate on the network 14 while not having an IP address. That is, the unnumbered interface is not an interface that is presently without an IP address but is granted one by the DHCP server 42. The unnumbered interface is an interface which does not have an IPv6 address which is routable in the network 14.

The systems and methods deliver the device-specific configuration to each NE device over unnumbered interfaces, e.g., unnumbered Ethernet point-to-point interfaces, OSC interfaces, and other optical interfaces, during ZTP/LTP. The systems and methods include modifications on the DHCP relay agent 50.

Problem Statement Re: OSPFv3

In the present disclosure, the network 14 is an IPv6 network and the DHCP relay agent 50 is a DHCPv6 relay agent 50 and the DHCP server 42 is a DHCPv6 server 42. Again, ZTP on IPv6 networks is a technique to allow the devices to be provisioned and configured automatically. As described herein, the terms network element 12, device, client, and ZTP client may be used interchangeably, and all refer to the network element 12 with unnumbered interfaces.

The device 12 sends out a DHCPv6 solicit message (i.e. request) to the DHCPv6 server 42 to obtain the location of its configuration. It then downloads and installs it. In the case that the device 12 is not in the same layer 2 network with the DHCPv6 server 42, DHCPv6 relay agents 50 are employed as a mediator to forward DHCPv6 packets between clients and servers. As shown in FIG. 4, the device 12, in the ZTP technology, is determined by the identity of the relay agent 50 as well as the local port connecting to the device 12. The DHCPv6 relay agent 50 reports that information via the vendor specific information option along with the DHCPv6 packets sent by the device 12 to the server 42 so that server 42 can reply the specific configuration to the device 12 in terms of the information.

For IPv6 networks, the DHCPv6 relay agent 50 can be used to facilitate ZTP through ILAN and OSC interfaces which are defined as unnumbered interfaces by default. The user does not provide any explicit provisioning information to help the ZTP client to establish data communication channel to the network 14. Therefore, the ZTP client must automate data communication configuration by itself in such a way that it can be reached on the network 14. The step is important because it enables the ZTP client to query the user-defined script from the network 14 for provisioning.

ZTP on IPv6 OSPFv3

Figure 5:
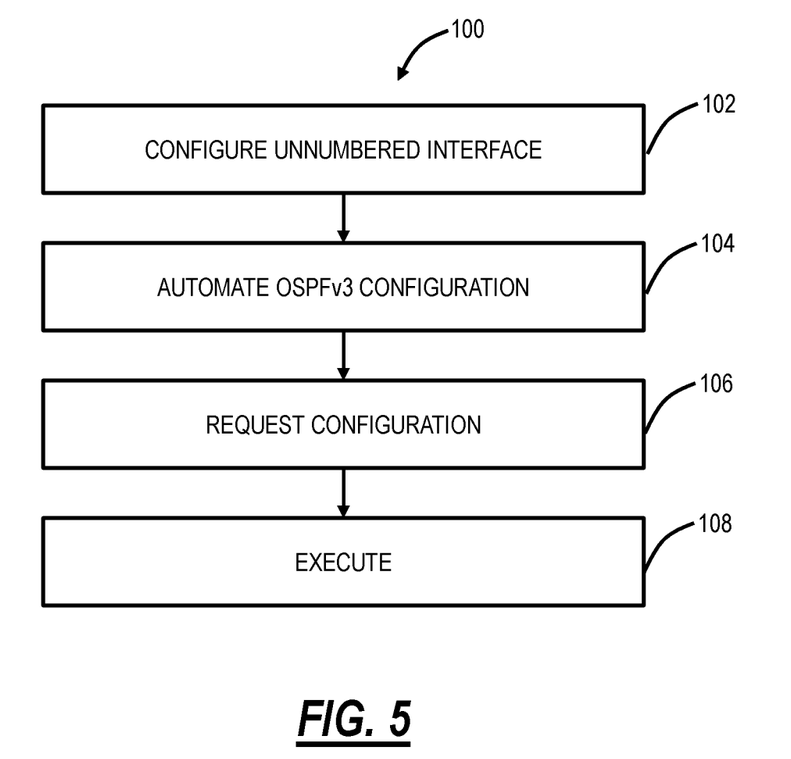
FIG. 5 is a flowchart of a ZTP process using a user-defined script to commission the network element on IPv6 OSPFv3 networks.

FIG. 5 is a flowchart of a ZTP process 100 using a user-defined script to commission the network element 12 on IPv6 OSPFv3 networks. When the ZTP network element 12 boots up, it configures unnumbered interfaces to IPv6 host mode and initiates DHCPv6 solicits to the DHCP server 42 (step 102). When a DHCP lease is received on an unnumbered interface, the assigned IPv6 address shall be configured to the loopback interface and as the "borrowed" IPv6 address of the receiving interface. The unnumbered interface borrows an IP address from another numbered interface on the network element 12. The IP address is then called a "borrowed" IP address. As described herein, the majority of the interfaces in the network element 12 can be configured as unnumbered to simplify the IP management because they all borrow the IP address of a (loopback) interface. Therefore, the network management software only needs to manage one IP address per network element 12.

The network element 12 automates the OSPFv3 provisioning so that it can reach the external network 14 (step 104).

The network element 12 requests a configuration (step 106). After the steps 102, 104, the ZTP client can be reached through the unnumbered interface by external servers. Therefore, at this step 106, the network element 12 can contact configuration servers acquiring a boot file in which the location of the user-defined script is defined. The ZTP client then reaches out to acquire the script.

The network element 12 receives the script which is executed on the network element 12 which may contact additional external sources for additional configurations (step 108).

The present disclosure includes focus on the step 104, namely OSPFv3 provisioning. In the IPv4 domain, the step 104 is achieved by sniffing the OSPF interface configuration parameters received from the relay agent 50. The OSPF router ID adopts the IPv4 address assigned by the DHCP server 42.

This cannot be fully applied to the IPv6 domain because the DHCPv6 server 42 cannot allocate any IPv4 address to its client. The ZTP client, however, requires IPv4 dotted decimal notation for provisioning the OSPFv3 router ID. Note that the other OSPFv3 interface configuration parameters can still be obtained by the original sniffing method.

This disclosure presents an approach for automating the formation of a unique OSPFv3 router ID so that the OSPFv3 router can be configured properly on the ZTP client. As a result, the step 104 can be performed successfully in IPv6 ZTP context.

OSPFv3 Router ID Buckets

Generally, the ZTP client 12 is configured to select a random value for its OSPFv3 router ID. This can be accomplished where the DHCPv6 relay agent 50 inserts several ranges of OSPFv3 router ID (i.e. buckets) in the DHCPv6 reply packets and forwards them to the ZTP client 12. These buckets do not contain any OSPFv3 router IDs that the DHCPv6 relay agent 50 knows of. When the ZTP client 12 receives this information, it knows that it is highly unlikely to have an OSPFv3 router ID conflict if it picks one of the router IDs from these buckets. Therefore, the ZTP client 12 can configure the OSPFv3 router using the router ID it picks. In case a duplicate OSPFv3 router ID is detected, the ZTP client 12 picks another OSPFv3 router ID from the next bucket. This makes sure that the ZTP client 12 has high probability to avoid duplicate OSPFv3 router ID in the next attempt.

Relay Agent on IPv6 Networks

Figure 6:
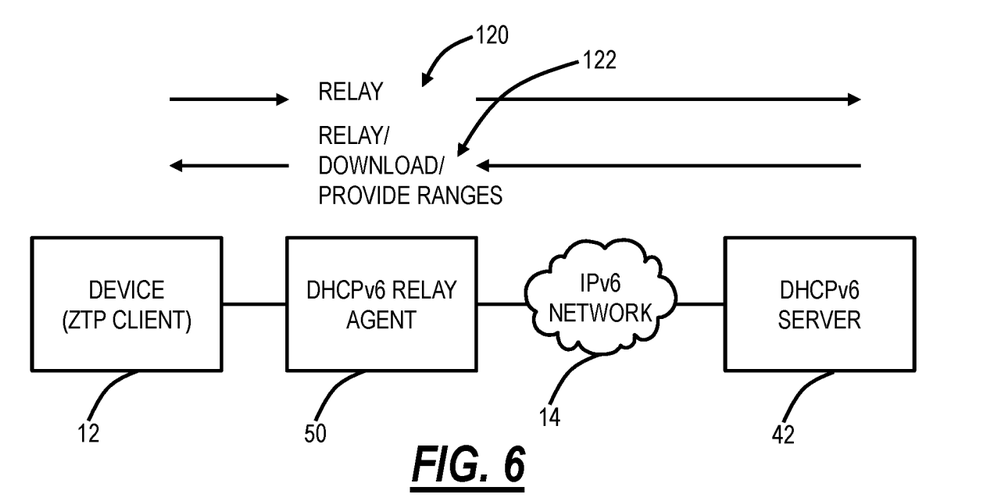
FIG. 6 is a network diagram of a DHCP relay agent between the network element and the DHCP server over the network illustrating actions by the DHCP relay agent.

As shown in FIG. 6, when the DHCPv6 relay agent 50 receives the DHCPv6 request packets from the ZTP client 12, it relays the packets to the DHCPv6 server 42 (step 120). If requested, the DHCPv6 relay agent 50 can add DHCPv6 relay agent options assisting the DHCPv6 server 42 to identify the ZTP client 12.

When the DHCPv6 relay agent 50 receives DHCPv6 reply packets from the DHCPv6 server 50, the DHCPv6 relay agent 50 either relays the reply packets, performs a download, or provides ranges of OSPFv3 router IDs (buckets) (step 122). Specifically, if the DHCPv6 reply packets do not contain some information for configuration, such as a Boot File Uniform Resources Locator (URL) option, the DHCPv6 relay agent 50 continues the standard DHCPv6 relay function. If the DHCPv6 reply packets include information for configuration, the DHCPv6 relay agent 50 downloads the boot file on behalf of the ZTP client based on the Boot File URL option. If the download fails, the DHCPv6 relay agent 50 can drop the DHCPv6 reply packets.

If the boot file specifies that a script is used for ZTP, then the DHCPv6 relay agent 50 provides ranges of OSPFv3 router IDs (buckets) for the ZTP client 12 and communicates them to the ZTP client 12. Of note, when the ZTP client 12 needs to run the script, it will need to communicate on the network 14 and needs an OSPFv3 router ID. Further, as mentioned herein, OSPFv3 requires an IPv4 address format for the router ID and this is unavailable in IPv6. Accordingly, the present disclosure provides the ZTP client one or more ranges (buckets) to select an address for the OSPFv3 router ID. The goal is to find an unused IPv4 address for the OSPFv3 router ID.

Those skilled in the art will recognize there can be various approaches for selecting an unused IPv4 address for the OSPFv3 router ID for the ZTP client 12. In an embodiment, the DHCPv6 relay agent 50 can perform the following approach to allow the ZTP client 12 to select an unused IPv4 address for the OSPFv3 router ID.

a) Divide the whole IPv4 address space into 2 k buckets starting from 0.0.0.0/k to 255.255.255.255/k where k denotes the IPv4 prefix length with the range of $1 \leq k \leq 32$. For example, when k=16, the whole IPv4 address space is divided into 65536 buckets starting from 0.0.0.0/16 to 255.255.0.0/16. That is, for each $0 \leq x \leq 255$ and $0 \leq y \leq 255$, the address range of each bucket is from x.y.0.0 to x.y.255.255. Each bucket contains 65536 IPv4 addresses each of which can be used as the OSPFv3 router ID.

b) Scan local OSPFv3 Link State Address (LSA) database to collect all OSPFv3 advertising router ID. For each router ID, if it falls into a bucket defined above, the bucket is marked as hit.

c) Randomly select a few buckets that are not hit as the candidate OSPFv3 router ID ranges.

d) Encode the selected buckets to the vendor specific information option of the DHCPv6 reply packet.

e) Specify the automatic routing in the vendor specific information option of the DHCPv6 reply packet.

f) Forward the DHCPv6 relay packet back to the client 12.

ZTP Script on the Client on IPv6 Networks

Figure 7:
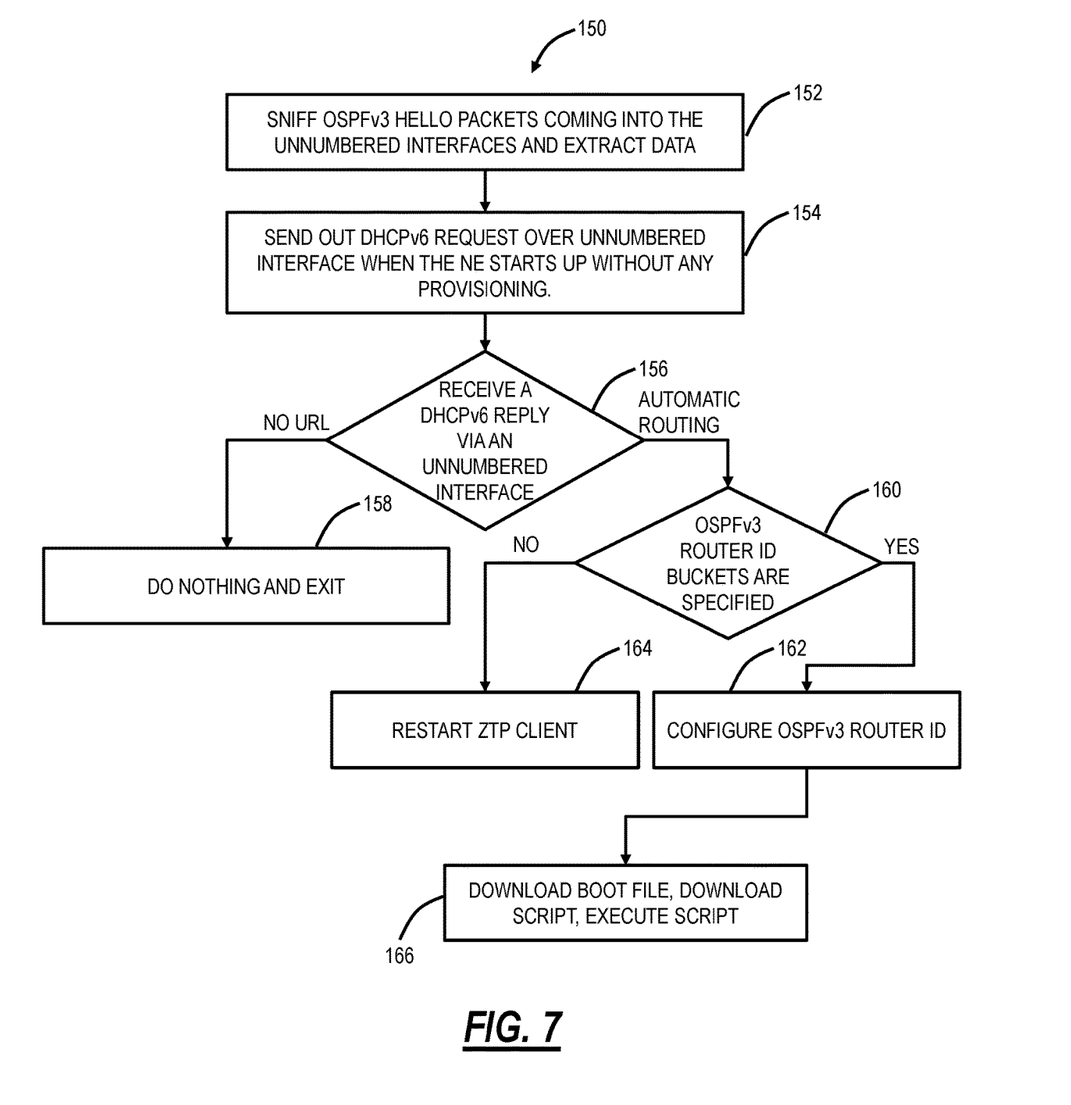
FIG. 7 is a flowchart of a ZTP client process for communication over unnumbered interfaces on IPv6 networks.

FIG. 7 is a flowchart of a ZTP client process 150 for communication over unnumbered interfaces on IPv6 networks. The ZTP client starts to sniff OSPFv3 Hello packets coming into the unnumbered interfaces and extracts data, such as OSPFv3 area ID, instance ID, Hello interval and dead interval (step 152). The ZTP client sends out DHCPv6 request over unnumbered interface when the NE starts up without any provisioning (step 154). The DHCPv6 request may contain the Client Identifier Option and the Vendor Class Option so that the client can be identified uniquely by the DHCPv6 server.

When the ZTP client receives a DHCPv6 reply via an unnumbered interface (step 156), if the reply does not contain the Boot File Uniform Resources Locator (URL) option, the ZTP client does nothing and the process 150 exits (158). If the automatic routing is specified in the vendor specific information option of the incoming DHCPv6 reply, then the client performs the following steps to automate routing.

If the OSPFv3 router ID buckets are specified in the vendor specific information option (step 160), perform the following steps to configure the OSPFv3 router ID (step 162); otherwise, the ZTP client restarts (step 164). The steps to configure the OSPFv3 router ID can include I) Selecting the first bucket and randomly select the last 32-k bits of the IPv4 address from $2^{32-k}$ combinations where $1 \le k \le 32$. For example, when k=16, randomly select the last two bytes of the IPv4 address from 65536 combinations. By doing such, an IPv4 address can be formed.

II) Configuring the OSPFv3 router and using the generated IPv4 address as the router ID.

III) Configuring OSPFv3 interface using the OSPFv3 interface parameters recorded in the step 152.

IV) Running a duplicate OSPFv3 router ID detection process (as described below).

With the OSPFv3 router ID configured on the ZTP client 12, the ZTP client 12 downloads the boot file, downloads the script, and executes the script (step 166). The boot file is downloaded based on the boot file URL option. If the boot file cannot be downloaded successfully, the ZTP client 12 can either run a duplicate OSPFv3 router ID resolution process (as described below) or restart the ZTP client 12.

The ZTP client 12 downloads the script specified in the boot file. If the script cannot be downloaded successfully, the ZTP client 12 can either run the duplicate OSPFv3 router ID resolution process (as described below) or restart the ZTP client 12.

The ZTP client 12 executes the script and with any failure, restart the ZTP client 12.

Duplicate OSPFv3 Router ID Detection

RFC 2328, OSPF version 2, April 1998, the contents of which are incorporated by reference, in Section 13.4 ("Receiving Self-Originated LSAs") describes the processing of received self-originated LSAs. After the LSA is determined to be self-originated, process the procedure described as follows.

1) If the received LSA is intra-area LSA with the Referenced LS Type equal to 0x2001 and is newer, go to the next step; otherwise, continue standard processing defined in the RFC.

2) Follow the steps below to examine each address prefix in the intra-area LSA until all of them are examined. When all address prefixes are examined, continue standard processing. If the prefix length of the address prefix is 128, check whether the address prefix is the same as the IPv6 address of the local loopback interface. If they are the same, continue standard processing; otherwise, a duplicate router ID is detected. Otherwise, examine the next address prefix in the intra-area LSA.

Duplicate OSPFv3 Router ID Resolution

If duplicate OSPFv3 router ID is detected by the Duplicate OSPF router ID detection process, then the following steps are performed.

1) Choose the next bucket. If all buckets have been considered once so there is no next bucket, then restart the ZTP process since the current bucket assignment has too many collisions.

2) Otherwise, the next bucket is available. Randomly select the last 32-k bits of the IPv4 address from $2^{32-k}$ combinations where $1 \le k \le 32$. For example, when k=16, randomly select the last 2 bytes of the IPv4 address from 65536 combinations. By doing such, an IPv4 address can be formed. Re-configure the OSPFv3 router using the generated IPv4 address as the OSPFv3 router ID.

ZTP Client Process

Figure 8:
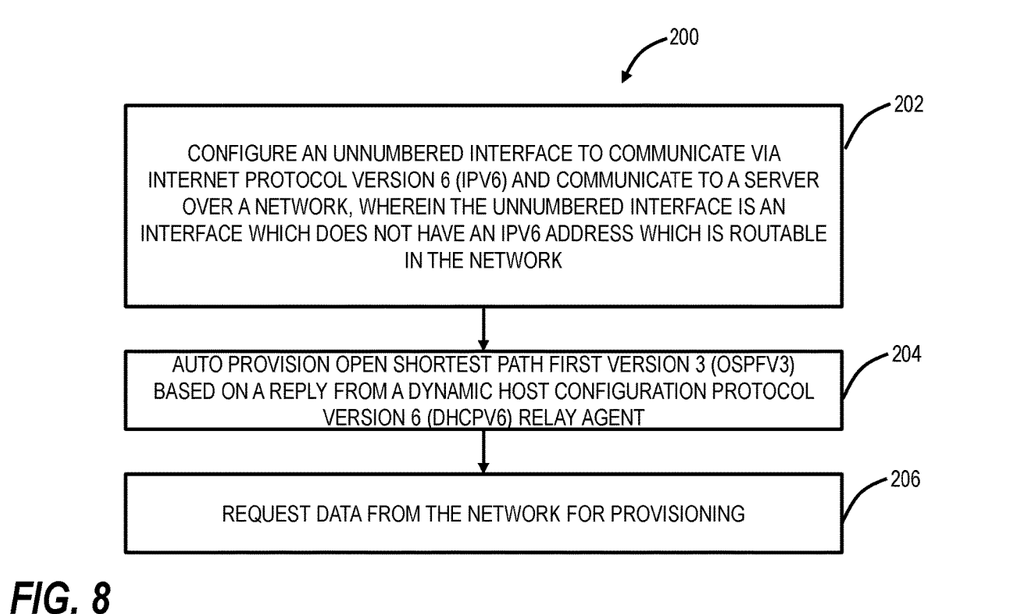
FIG. 8 is a flowchart of a Zero Touch Provisioning (ZTP) client process.

FIG. 8 is a flowchart of a Zero Touch Provisioning (ZTP) client process 200. The ZTP client process 200 can be implemented as a method having steps, via a processing device such as in the network element 12, and as instructions executed by one or more processors and stored in a non-transitory computer-readable medium.

The process 200 includes configuring an unnumbered interface to communicate via Internet Protocol version 6 (IPv6) and communicate to a server over a network, wherein the unnumbered interface is an interface which does not have an IPv6 address which is routable in the network (step 202), auto provision Open Shortest Path First version 3 (OSPFv3) based on a reply from a Dynamic Host Configuration Protocol version 6 (DHCPv6) relay agent (step 204), and requesting data from the network for provisioning (step 206).

The process 200 can include, for the auto provision, sniffing OSPFv3 Hello packets on the unnumbered interface to extract data therefrom, and selecting an OSPFv3 router identifier (ID) based on a random, unused value.

The process 200 can include, for the auto provision, selecting an OSPFv3 router identifier (ID) based on a random, unused value based on the reply from the DHCPv6 relay agent. The reply from the DHCPv6 relay agent can include one or more ranges of unused OSPFv3 router IDs.

The process 200 can include performing duplicate OSPFv3 router identifier (ID) detection and resolution. Link State Advertisements (LSAs) are examined to detect duplicate OSPFv3 router IDs.

The ZTP client can be associated with a network element having a plurality of network interfaces including the unnumbered interface and a numbered interface, wherein the unnumbered interface borrows an IPv6 address from the numbered interface. The unnumbered interface can be on an Optical Service Channel (OSC).

The process 200 can include causing a restart of the ZTP client based on occurrence of a plurality of failures.

DHCP Relay Agent Process

Figure 9:
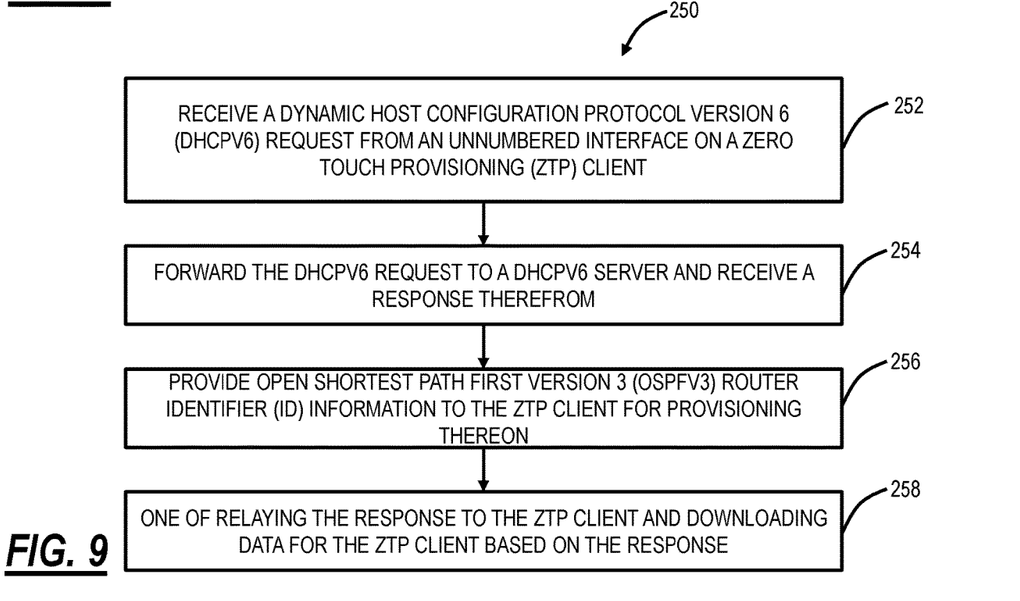
FIG. 9 is a flowchart of a Dynamic Host Configuration Protocol (DHCP) relay agent process.

FIG. 9 is a flowchart of a Dynamic Host Configuration Protocol (DHCP) relay agent process 250. The DHCP relay agent process 250 can be implemented as a method having steps, via a processing device such as in the network element 12, and as instructions executed by one or more processors and stored in a non-transitory computer-readable medium.

The process 250 includes receiving a Dynamic Host Configuration Protocol version 6 (DHCPv6) request from an unnumbered interface on a Zero Touch Provisioning (ZTP) client (step 252), forwarding the DHCPv6 request to a DHCPv6 server and receive a response therefrom (step 254), provide Open Shortest Path First version 3 (OSPFv3) router identifier (ID) information to the ZTP client for provisioning thereon (step 256), and one of relaying the response to the ZTP client and downloading data for the ZTP client based on the response (step 258).

The process 250 can include dividing the Internet Protocol version 4 (IPv4) address space into ranges, and providing one or more unused ranges to the ZTP client. The one or more unused ranges can be determined based on examination of Link State Advertisements (LSAs).

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A Zero Touch Provisioning (ZTP) client comprising:
one or more processors and memory comprising instructions that, when executed, cause the one or more processors to
configure an unnumbered interface to communicate via Internet Protocol version 6 (IPv6) and communicate to a server over a network, wherein the unnumbered interface is an interface which does not have an IPv6 address which is routable in the network,
auto provision Open Shortest Path First version 3 (OSPFv3) based on a reply from a Dynamic Host Configuration Protocol version 6 (DHCPv6) relay agent, wherein the auto provision includes construction of a selected OSPFv3 router identifier (ID) and configuration based thereon, wherein the OSPFv3 router ID is selected because the DHCPv6 server cannot allocate any IPv4 address to its client, and
request data from the network for provisioning.

2. The ZTP client of claim 1, wherein, for the auto provision, the instructions that, when executed, further cause the one or more processors to
sniff OSPFv3 Hello packets on the unnumbered interface to extract data therefrom, and
select the OSPFv3 router identifier (ID) based on a random, unused value.

3. The ZTP client of claim 1, wherein, for the auto provision, the instructions that, when executed, further cause the one or more processors to
select the OSPFv3 router identifier (ID) based on a random, unused value based on the reply from the DHCPv6 relay agent.

4. The ZTP client of claim 3, wherein the reply from the DHCPv6 relay agent includes one or more ranges of unused OSPFv3 router IDs.

5. The ZTP client of claim 1, wherein the instructions that, when executed, further cause the one or more processors to
perform duplicate OSPFv3 router identifier (ID) detection and resolution.

6. The ZTP client of claim 5, wherein, for the duplicate OSPFv3 router ID detection, the instructions that, when executed, further cause the one or more processors to
examine Link State Advertisements (LSAs) to detect duplicate OSPFv3 router IDs.

7. The ZTP client of claim 1, wherein the ZTP client is associated with a network element having a plurality of network interfaces including the unnumbered interface and a numbered interface, wherein the unnumbered interface borrows an IPv6 address from the numbered interface.

8. The ZTP client of claim 1, wherein the unnumbered interface is on an Optical Service Channel (OSC).

9. The ZTP client of claim 1, wherein the instructions that, when executed, further cause the one or more processors to
cause a restart of the ZTP client based on occurrence of a plurality of failures.

10. A Dynamic Host Configuration Protocol (DHCP) relay agent comprising:
one or more processors and memory comprising instructions that, when executed, cause the one or more processors to
receive a Dynamic Host Configuration Protocol version 6 (DHCPv6) request from an unnumbered interface on a Zero Touch Provisioning (ZTP) client,
forward the DHCPv6 request to a DHCPv6 server and receive a response therefrom,
provide a selected Open Shortest Path First version 3 (OSPFv3) router identifier (ID) information to the ZTP client in DHCPv6 reply packets, for provisioning thereon, wherein the OSPFv3 router ID is selected because the DHCPv6 server cannot allocate any IPv4 address to its client, and one of relay the response to the ZTP client and download data for the ZTP client based on the response.

11. The DHCP relay agent of claim 10, wherein, to provide the OSPFv3 router ID information, the instructions that, when executed, further cause the one or more processors to divide the Internet Protocol version 4 (IPv4) address space into ranges, and provide one or more unused ranges to the ZTP client.

12. The DHCP relay agent of claim 11, wherein the one or more unused ranges are determined based on examination of Link State Advertisements (LSAs).

13. A method implemented in a client comprising:

configuring an unnumbered interface to communicate via Internet Protocol version 6 (IPv6) and communicate to a server over a network, wherein the unnumbered interface is an interface which does not have an IPv6 address which is routable in the network;

auto provisioning Open Shortest Path First version 3 (OSPFv3) based on a reply from a DHCPv6 relay agent, wherein the auto provision includes construction of a selected OSPFv3 router identifier (ID) and configuration based thereon, wherein the OSPFv3 router ID is selected because the DHCPv6 server cannot allocate any IPv4 address to its client; and requesting data from the network for provisioning.

14. The method of claim 13, further comprising sniffing OSPFv3 Hello packets on the unnumbered interface to extract data therefrom, and selecting the OSPFv3 router identifier (ID) based on a random, unused value.

15. The method of claim 13, further comprising selecting the OSPFv3 router identifier (ID) based on a random, unused value based on the reply from the DHCPv6 relay agent.

16. The method of claim 15, wherein the reply from the DHCPv6 relay agent includes one or more ranges of unused OSPFv3 router IDs.

17. The method of claim 13, further comprising performing duplicate OSPFv3 router identifier (ID) detection and resolution.

18. The method of claim 17, further comprising examining Link State Advertisements (LSAs) to detect duplicate OSPFv3 router IDs.

19. The method of claim 13, wherein the client is associated with a network element having a plurality of network interfaces including the unnumbered interface and a numbered interface, wherein the unnumbered interface borrows an IPv6 address from the numbered interface.

20. The method of claim 13, wherein the unnumbered interface is on an Optical Service Channel (OSC).

* * * * *